No. 889,599.

PATENTED JUNE 2, 1908.

S. B. GOFF.
CESSPOOL, DRAIN, AND DISTRIBUTER.
APPLICATION FILED DEC. 23, 1907.

Witnesses
P. F. Nagle
L. Douville

Inventor
Samuel B. Goff
By Wiedersheim Fairbanks
Attorneys

UNITED STATES PATENT OFFICE.

SAMUEL B. GOFF, OF CAMDEN, NEW JERSEY.

CESSPOOL, DRAIN, AND DISTRIBUTER.

No. 889,599.

Specification of Letters Patent.

Patented June 2, 1908.

Application filed December 23, 1907. Serial No. 407,839.

*To all whom it may concern:*

Be it known that I, SAMUEL B. GOFF, a citizen of the United States, residing at Camden, county of Camden, State of New Jersey, have invented a new and useful Cesspool, Drain, and Distributer, of which the following is a specification.

My invention consists of a cess pool adapted to receive fecal matters and urine in different compartments, adapt the urine to be drained into the ground and adapt the fecal matters and urine to be separately carted or carried away.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1:
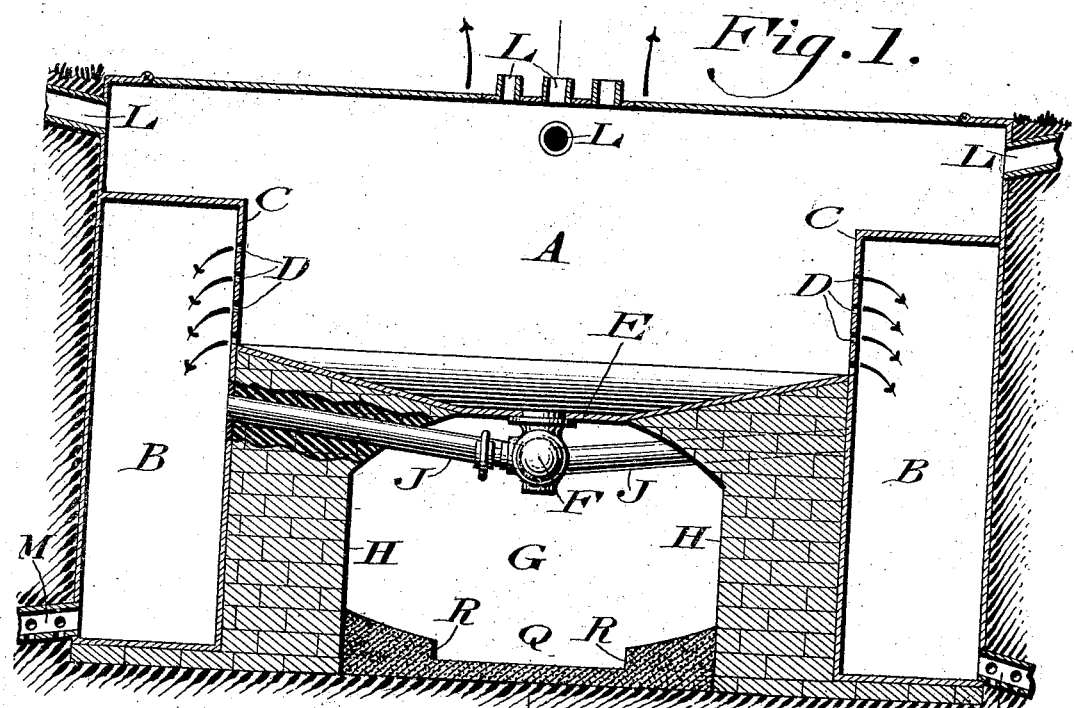
Figure 2:
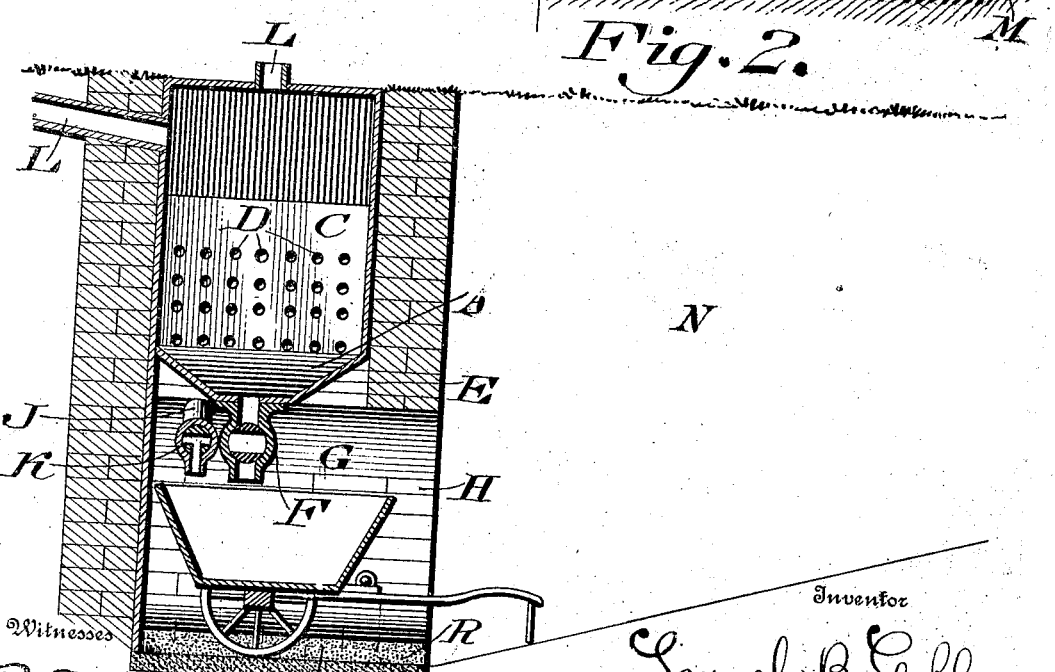

Figure 1 represents a longitudinal vertical section of a cess pool, drain and distributer embodying the invention. Fig. 2 represents a transverse vertical section thereof.

Similar letters of reference indicate corresponding parts in the figures.

Referring to the drawing:—A designates the primary receptacle of a cess pool, and B designates vessels at the sides of the same, the inner wall C of said vessels having openings D therein, whereby said vessels and receptacle are in communication.

The bottom E of the receptacle is dishing and has connected with it the outlet valve F, the same opening in the vault G whose masonry H supports said bottom E.

Connected with the inner walls C of the vessel B are the pipes J, which pass inwardly from said vessel through the masonry H and are confluent in the vault G where they are connected with the outlet valve K, the latter opening into the vault G.

L designates a series of inlet pipes, which lead from different apartments or places into the receptacle A.

M designates pipes which are connected with the bottom portions of the vessels B and open into the ground aside of the latter.

The vault is located below the surface of the ground and accessible at an opening N of the latter in front of the same, the bottom of said opening forming the slope P, whereby a cart or other vehicle, a can, etc. may be directed into said vault so as to be beneath the valves F, K, as most plainly shown in Fig. 2.

The operation is as follows:—Fecal matters and urine are directed into the receptacle A, and collected in the bottom E thereof. As the urine rises in the receptacle, it flows through the openings D into the vessels B, from whence it may slowly escape through the pipes M and drain into the ground, thus serving to fertilize the same, it being noticed that the perforations D are numerous and together are of greater area than the pipes M, hence the urine will be admitted into the vessels B more rapidly than it is discharged, and so it will rise into said vessels above the pipes, when, if desired, it can be discharged into the receiver in the vault, the valve K being duly opened, the urine thus being directed elsewhere for purposes of fertilization. When it is desired to remove the fecal matters and urine from the receptacle A, the valve F is opened, when said matters and urine flow into the receiver below the same, by which they can be carried elsewhere for purposes of fertilization, or for cleansing said receptacle A when so required.

The base Q of the vault is cemented for the purposes of cleanliness, and has shoulders P on the sides of the central portion of the same, so as to guide a vehicle into the vault so as to be properly located beneath the valves F, K.

Having thus described my invention, what I claim as new and desire to secure by Letters Patent, is:—

1. A primary receptacle, a secondary vessel in communication therewith, a conduit leading from the secondary vessel and outlet valves for said receptacle and vessel opening to a common point of deposit.

2. A primary receptacle, a secondary vessel in communication therewith, a conduit leading from the secondary vessel outlet valves for said receptacle and vessel opening to a common point of deposit, and a drain pipe for said vessel.

3. A receptacle, a secondary vessel having openings near its upper end for the flow of liquid material from said receptacle into said vessel, a vault beneath said receptacle, an outlet from the receptacle into the vault, a conduit from said vessel into the vault, and valves controlling the flow from the receptacle and vessel into the vault.

4. A receptacle, a secondary vessel having openings near its upper end for the flow of liquid material from said receptacle into said vessel, a vault beneath said receptacle, an outlet from the receptacle into the vault, a conduit from said vessel into the vault, and valves controlling the flow from the receptacle and vessel into the vault, said valves being disposed beneath the receptacle, within the vault.

5. A primary receptacle, a secondary vessel with openings above the bottom of said receptacle and in communication therewith, an outlet valve for said receptacle, a discharge pipe connected with said vessel near its upper end, an outlet valve on said pipe, and a vault adjacent to said receptacle, said valves being adapted to open into said vault.

6. A primary receptacle, a secondary vessel in communication therewith, an outlet valve for said receptacle, a discharge pipe connected with said vessel, an outlet valve on said pipe, a vault adjacent to said receptacle, said valves being adapted to open into said vault, and a drain pipe connected with said vessel said drain pipe being of less area than the inlet openings from said receptacle into said vessel.

7. A receptacle, a vault beneath the same, a secondary vessel having openings near its upper end to receive liquid material from said receptacle, a conduit from the said vessel to the vault, a discharge valve for said receptacle, the same opening into said vault, and a flooring for said vault having means for properly guiding a vehicle into said vault beneath said valve.

8. A primary receptacle, a secondary vessel having openings near its top for receiving the overflow from said receptacle, a vault beneath said receptacle, and a valve controlled communication from said vessel below said openings and discharging into said vault.

SAMUEL B. GOFF.

In the presence of—
  C. D. McVay,
  E. C. Geyer.